US008215519B2

(12) United States Patent
Steininger

(10) Patent No.: US 8,215,519 B2
(45) Date of Patent: Jul. 10, 2012

(54) FLUID DISPENSING VALVE

(75) Inventor: Jeff Steininger, Saint Marys, OH (US)

(73) Assignee: Zak Designs, Inc., Spokane, WA (US)

( * ) Notice: Subject to any disclaimer, the term of this patent is extended or adjusted under 35 U.S.C. 154(b) by 395 days.

(21) Appl. No.: 12/587,428

(22) Filed: Oct. 6, 2009

(65) Prior Publication Data

US 2011/0079601 A1 Apr. 7, 2011

(51) Int. Cl.
*A61J 9/00* (2006.01)
*A61J 9/04* (2006.01)
*B65D 51/16* (2006.01)
*A47G 19/22* (2006.01)

(52) U.S. Cl. ............ 220/714; 220/203.01; 220/203.05; 220/203.11; 220/710.5; 220/711; 220/713; 220/715; 251/205; 215/11.4; 215/11.5; 215/387; 215/388

(58) Field of Classification Search .......... 220/203.01, 220/203.05, 203.11, 710.5, 711, 713, 714, 220/715; 251/205, 304; 215/11.4, 11.5, 215/387, 388
See application file for complete search history.

(56) References Cited

U.S. PATENT DOCUMENTS 5,890,620 A * 4/1999 Belcastro ................. 220/714

* cited by examiner

*Primary Examiner* — Anthony Stashick
*Assistant Examiner* — Madison L Wright
(74) *Attorney, Agent, or Firm* — Paine Hamblen LLP

(57) ABSTRACT

A fluid dispensing valve is described which includes a valve housing having a wall which defines an internal cavity, and wherein a passageway is formed through the wall of the valve housing; and a valve control element having a continuous and deformable sidewall is coaxially and rotatably received within the internal cavity of the valve housing, and wherein at least a portion of the sidewall of the valve control element deforms when a vacuum is created in the internal cavity of the valve housing so as facilitate the controllable delivery of a source of fluid into the valve housing.

17 Claims, 6 Drawing Sheets

FLUID DISPENSING VALVE

TECHNICAL FIELD

The present invention relates to a fluid dispensing valve, and more specifically to a fluid dispensing valve which finds particular usefulness when incorporated into a drinking vessel which is suitable for use by infants, and young children.

BACKGROUND OF THE INVENTION

The prior art is replete with numerous examples of various valves or other assemblies which have been utilized to meter small amounts of fluid to a young child or an infant in order to properly teach them how to drink from a cup or other drinking vessel. Still further, the prior art is replete with numerous valving arrangements which substantially seals a cup or drinking vessel in the event that the drinking vessel is overturned by the child or infant, but which is operable to permit the flow of fluid into the infant or child's mouth when the child properly sucks upon the drinking vessel.

While the various arrangements found in the prior art have worked with varying degrees of success, as a general matter, none of the known arrangements have provided a convenient means whereby a parent or guardian may conveniently adjust the volumetric flow of the fluid provided by a drinking vessel to an infant or a child as the child progressively masters the technique of drinking on their own.

Therefore, a fluid dispensing valve which avoids the determents associated with the prior art devices and arrangements utilized heretofore is the subject matter of the present application.

SUMMARY OF THE INVENTION

A first aspect of the present invention relates to a fluid dispensing valve which includes a valve housing having a wall which defines an internal cavity, and wherein a passageway is formed through the wall of the valve housing; and a valve control element having a continuous and deformable sidewall is coaxially and rotatably received within the internal cavity of the valve housing, and wherein at least a portion of the sidewall of the valve control element deforms when a vacuum is created in the internal cavity of the valve housing so as facilitate the controllable delivery of a source of fluid into the valve housing.

Another aspect of the present invention relates to a fluid dispensing valve which includes a fluid container defining a cavity for enclosing a source of fluid to be dispensed, and wherein the fluid container has a top peripheral edge; a detachable cover which sealably matingly cooperates with the top peripheral edge of the fluid container, and which has a first surface facing in the direction of the cavity of the fluid container, and a second opposite surface which faces outwardly relative thereto, and wherein the detachable cover has a first and second opening which individually extend through both the first and second surfaces, and which couples the ambient environment to the cavity of the fluid container, and wherein the second surface defines a sipping spout, and the first opening is formed in the sipping spout; a valve housing made integral with the first surface of the detachable cover, and which is defined by a substantially cylindrically shaped wall which extends normally outwardly relative to the first surface of the detachable cover, and which further defines an internal cavity, and wherein the internal cavity of the valve housing is substantially aligned with the first opening formed in the detachable cover, and the cylindrically shaped wall of the valve housing has a passageway formed therein; and a valve control element having a main body defined by a continuous, cylindrically shaped, and partially deformable sidewall which is sized so as to be coaxially and rotatably received within the cavity defined by the valve housing, and wherein the deformable sidewall when disposed, at least in part, in juxtaposed relation relative to the passageway formed in the wall of the valve housing deforms under the influence of a vacuum created in the valve housing by a user's mouth sucking action applied to the sipping spout, and wherein fluid contained in the fluid container can pass through the passageway formed in the valve housing and past the deformed sidewall of the valve control element so as to enter the valve housing and be delivered through the sipping spout to the user.

Still another aspect of the present invention relates to a fluid dispensing valve for a fluid container which includes a fluid container defining a cavity for enclosing a source of fluid to be dispensed, and wherein the fluid container has top peripheral edge; a detachable cover sealably engaging the top peripheral edge of the fluid container, and wherein the detachable cover has a first inwardly facing surface which faces in the direction of the cavity, and a second outwardly facing surface, and wherein a sipping spout extends outwardly relative to the second outwardly facing surface, and has formed therein a first opening which extends through the first and second surfaces of the detachable cover, and wherein a semi-circular sidewall extends substantially normally outwardly relative to the first inwardly facing surface of the detachable cover, and further has an intermediate portion, and wherein the semi-circular sidewall has opposite inwardly and outwardly disposed sidewall surfaces, and wherein a second opening is formed in the detachable cover and extends through the intermediate portion of the semi-circular sidewall so as to couple the cavity of the fluid container in air pressure exchanging relation relative to the ambient environment, and wherein the intermediate portion of the semi-circular sidewall has a thickness dimension which is greater than the thickness dimension of the remaining portion of the semi-circular sidewall; a cylindrically shaped valve housing wall mounted on first surface of the detachable cover, and which is affixed at least in part to the intermediate portion of the semi-circular sidewall and which is disposed at least in part in spaced relation relative to the inwardly disposed sidewall surface of the semi-circular sidewall, and wherein a guide channel is defined therebetween the semi-circular sidewall and the cylindrically shaped valve housing wall, and wherein the cylindrically shaped valve housing wall extends normally outwardly relative to the first surface of the detachable cover, and is substantially concentrically outwardly oriented relative to the first opening, and wherein the cylindrically shaped valve housing wall defines an internal cavity, and wherein a passageway is formed through the cylindrically shaped valve housing wall; a hand manipulatable valve control base member having opposite first and second surfaces; a cylindrically shaped valve control element which is mounted on the second surface of the hand manipulatable valve control base member, and wherein the valve control element has a cylindrically shaped sidewall having an outside diametral dimension, and an inside diametral dimension which defines an internal cavity, and wherein the internal cavity of the valve control element is substantially coaxially aligned relative to the first opening which extends through the detachable cover, and wherein the valve control element is telescopingly received within the cylindrically shaped valve housing wall, and wherein the sidewall of the valve control element is located in supported juxtaposed relation thereagainst the cylindrically shaped valve housing wall, and wherein the sidewall of the valve control element has a deformable portion having a variable thickness dimension when that thickness dimension is measured in the circumferential direction, and wherein the valve control element is selectively rotatable relative to the cylindrically shaped valve housing wall so as to locate the deformable portion in alignment relative to passageway formed through the cylindrically shaped valve housing wall, and wherein a suction applied by the mouth of a user to the sipping spout causes the deformable potion of the cylindrically shaped sidewall of the valve control element to deform and move out of juxtaposed engagement relative to the cylindrically shaped valve housing wall so as allow the fluid to be dispensed to pass through the passageway formed in the valve housing wall, and into the first opening where it is delivered to the user, and wherein the user, upon releasing the suction on the drinking spout causes the deformable portion of the cylindrically shaped valve control member to assume a sealing, occluding orientation relative to the passageway formed in valve housing wall, and wherein the selective rotatable positioning of the deformable portion of the valve control element sidewall relative to the passageway formed in the valve housing wall causes a selective, variable amount of fluid to be dispensed through the sipping spout.

These and other aspects of the present invention will be described in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
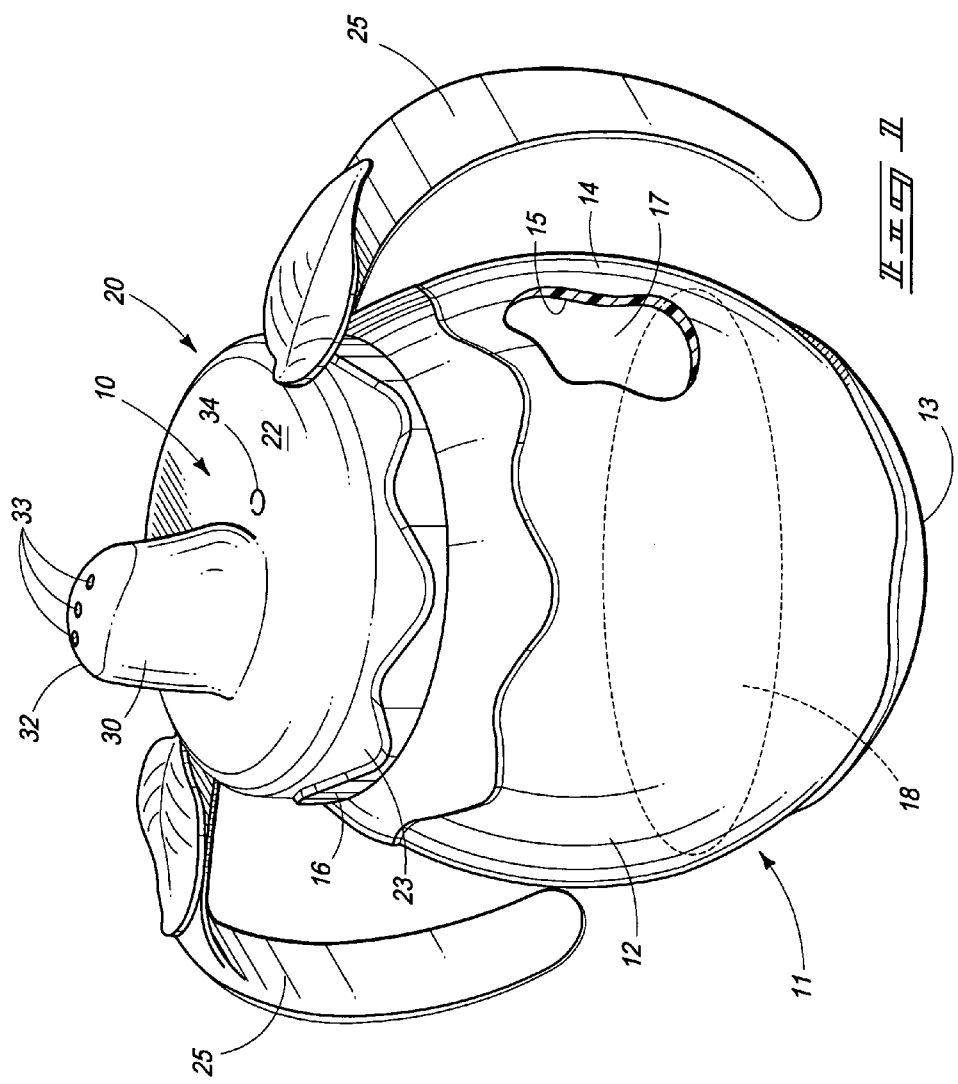
FIG. 1 is a perspective, side elevation view of a drinking vessel which incorporates the fluid dispensing valve of the present invention.
Figure 2:
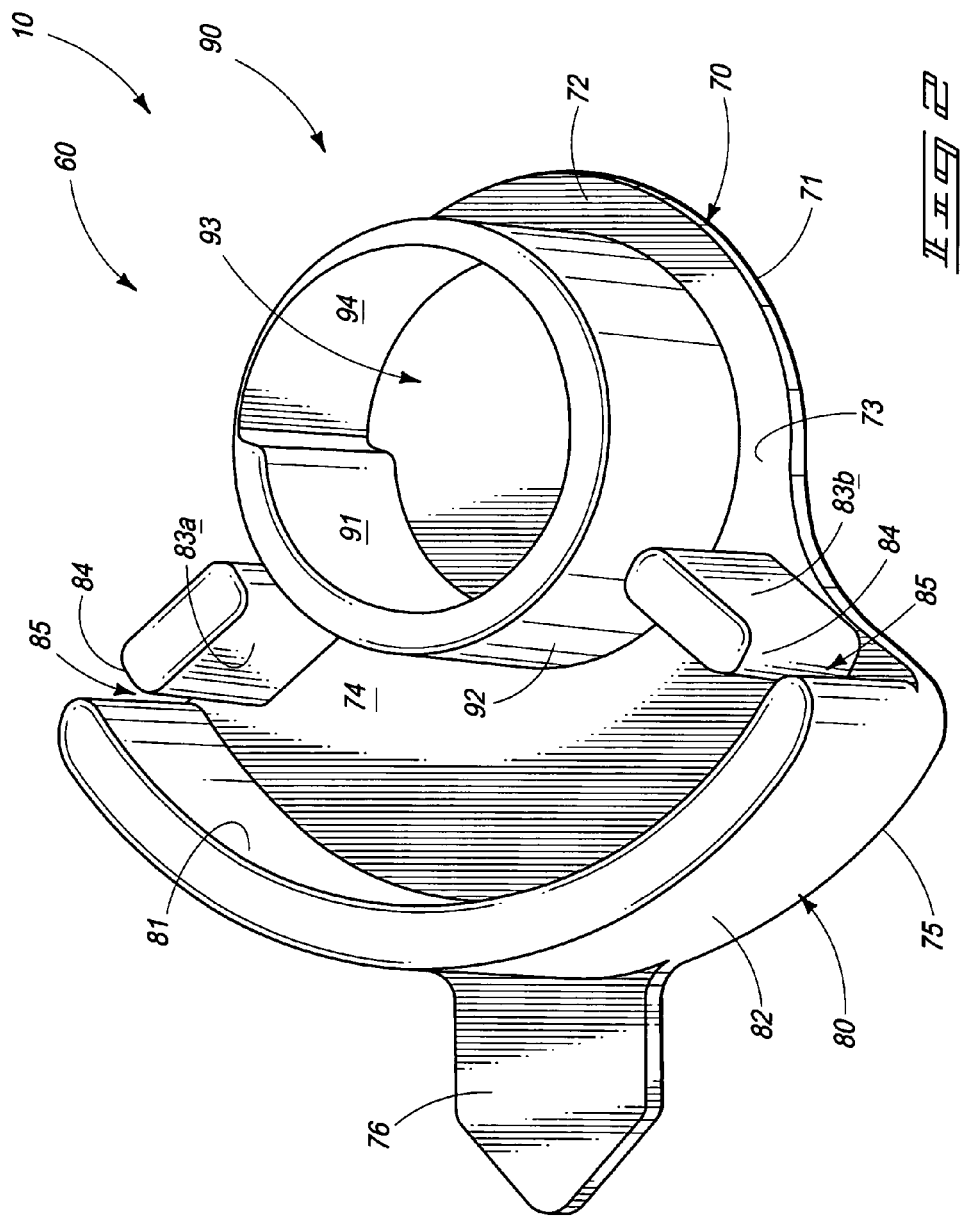
FIG. 2 is a perspective view of a valve control element which forms a feature of the present invention.
Figure 6:
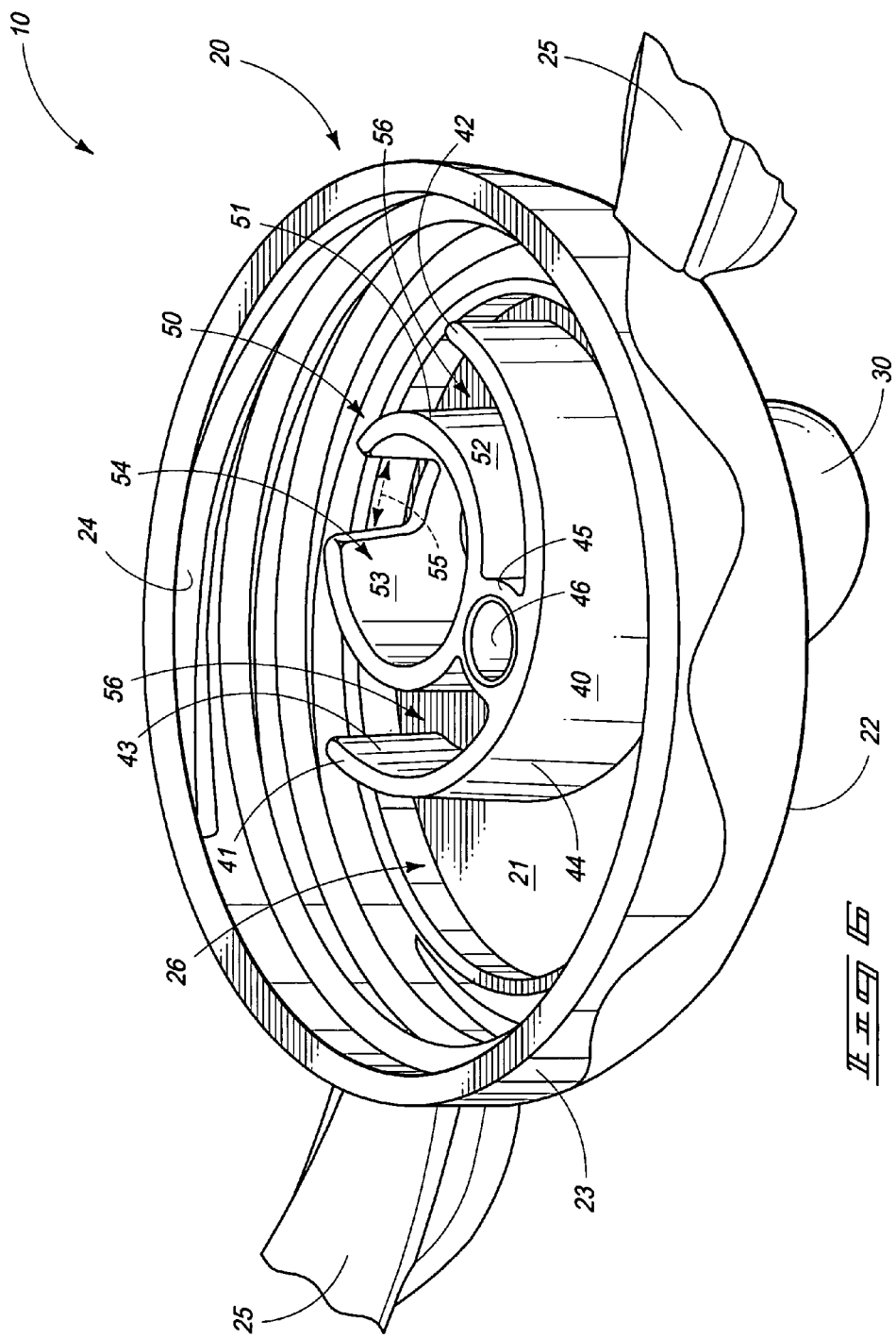
FIG. 6 is a fragmentary, perspective view of a detachable cover mounting a cylindrically shaped valve control element which forms a feature of the present invention.

The fluid dispensing valve of the present invention is generally indicated by the numeral 10 in FIG. 2 and following. Beginning with FIG. 1, it will be appreciated that the fluid dispensing valve 10 of the present invention is employed to meter fluid from a drinking container which is generally indicated by the numeral 11. The drinking container is formed of a continuous, generally vertically oriented and continuous sidewall 12, and further includes a bottom surface 13 which supports the drinking container on a supporting surface. Further, the continuous sidewall is defined by an outside facing surface 14, and an opposite, inside facing surface which is generally indicated by the numeral 15. Still further, the continuous sidewall 12 defines a top peripheral edge 16, and the inside facing surface 15 defines a container cavity 17 which encloses or stores a fluid to be dispensed which is generally indicated by the numeral 18. Referring more specifically to FIGS. 1 and 6, the present invention 10 and more specifically, the drinking container or vessel 11 releasably matingly couples with a detachable cover which is generally indicated by the numeral 20. The detachable cover has a first surface 21, which faces in the direction of the container cavity 17, and an opposite second surface 22. Still further, the detachable cover 20 has a circumscribing peripheral edge 23 which has a suitable thread 24 formed on the first surface 21 thereof, and which is operable to threadably mate with the top peripheral edge 16 of the drinking container 11. Still further, as seen in FIG. 1, a pair of handles 25 are mounted on the detachable cover 20 and extend laterally outwardly relative to the peripheral edge 23 of the detachable cover 20, and which can be grasped by both hands of an infant or small child so as to enable the child to manually manipulate the drinking container or vessel 11 with greater ease. Still further, as best seen by references to FIGS. 4 and 6, the first surface 21, at least in part, forms a cover cavity 26 and which partially encloses or receives other structures which will be discussed in greater detail in the paragraphs which follow.

Figure 5:
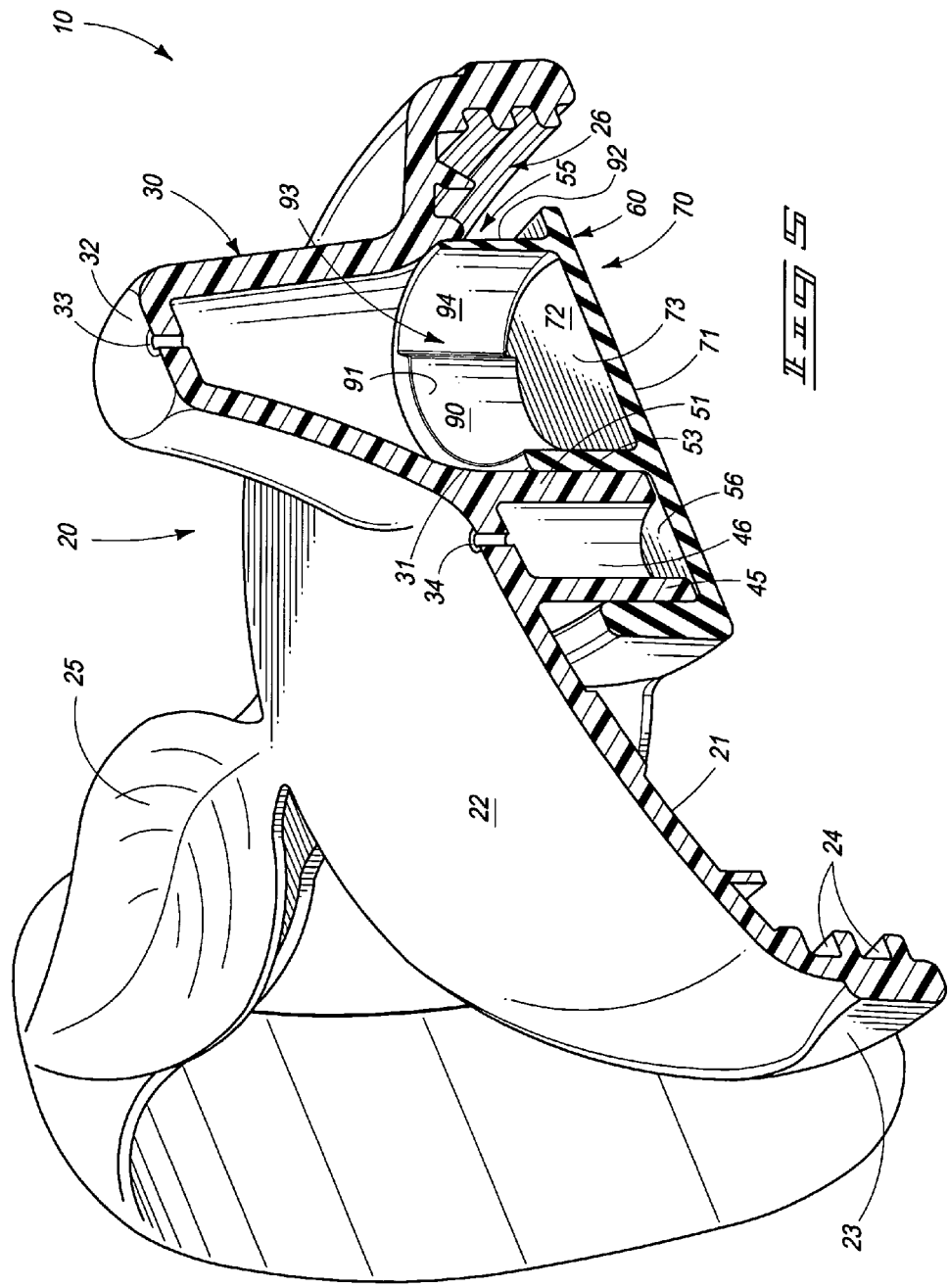
FIG. 5 is a fragmentary, transverse, vertical, sectional view of the fluid dispensing valve of the present invention.

Referring now to FIGS. 1 and 5, it will be seen that a sipping spout 30 extends upwardly relative to the second surface 22, and is shaped so as to be able to be easily received within the mouth of a young child or an infant (not shown). The sipping spout 30 has a proximal end 31, and an opposite, distal end 32, which is received in the mouth of the child. Still further, as seen in FIGS. 1 and 5, a first opening 33 is formed in the distal end 32, and extends through the first and second surfaces 21 and 22 so as to couple the ambient environment with the cover cavity 26. Additionally, as seen in the drawings, a second opening 34 is formed in a detachable cover 20 and extends through the first and second surfaces 21 and 22 so as to couple the ambient air pressure with the container cavity 17 so as to facilitate the flow of the liquid to be dispensed 18 out of the drinking vessel when a child drinks from the sipping spout 30.

Figure 4:
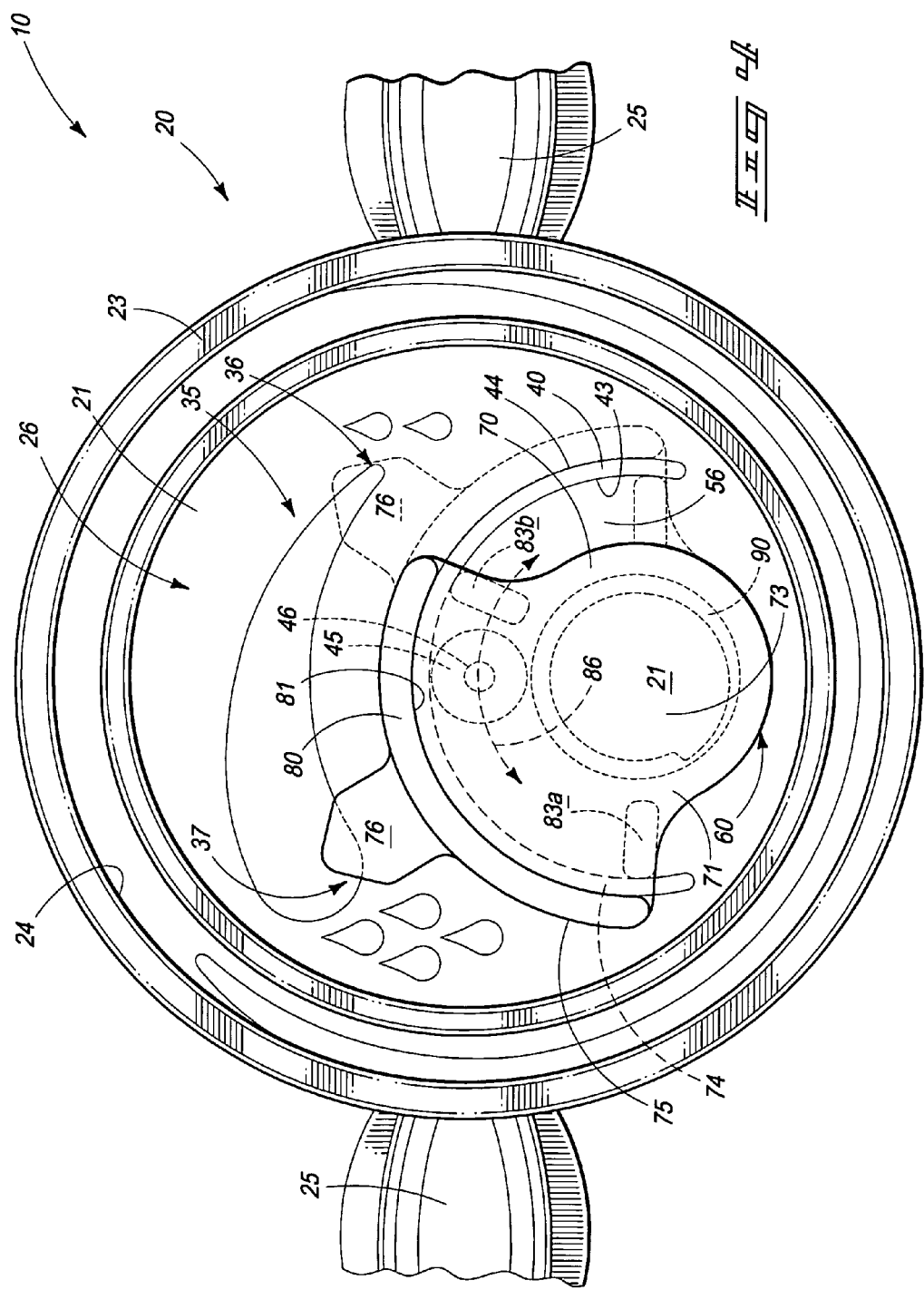
FIG. 4 is a bottom plan view of a valve control element forming a feature of the present invention, and which is shown installed within a fluid container.

As seen in FIG. 4, printed or molded indicia 35 is placed on the first surface 21 and generally graphically indicates the amount of fluid that may be released by the fluid dispensing valve 10 when it is positioned in various positions along a given path of travel. In this regard, the printed indicia includes a first valve position 36 which will only allow the fluid dispensing valve 10 to release a small amount of fluid when the child provides sucking action on the sipping spout 30; and a second position 37 which allows a maximum amount of fluid 18 to be released when the child exerts sucking action on the sipping spout 30.

Referring now to FIG. 6, it will be seen that a semi-circular first sidewall 40 is mounted on, and extends substantially normally outwardly relative to the first inwardly facing surface 21 of the detachable cover 20. The semi-circular first sidewall 40, has a first end 41, and an opposite second end 42. Still further, the semi-circular first sidewall 40 has a first inwardly facing sidewall surface 43, and a second opposite and outwardly facing sidewall surface 44. Additionally, the first sidewall 40 defines an intermediate portion 45 which has a passageway 46 formed therein, and which is coupled in fluid flowing relation relative to the second opening or aperture 34 which is formed in the detachable cover 20 (FIG. 5). It will be recognized that the second opening is formed in the detachable cover 20 and extends through the intermediate portion of the first semi-circular sidewall 40 by means of the passageway 46 so as to couple the container cavity 17 in air pressure exchanging relation relative to the ambient environment. As seen in FIG. 6, the intermediate portion 45 has a thickness dimension which is greater than the thickness dimension of the remaining portions of the semi-circular first sidewall 40 as measured between the first and second ends 41 and 42 and in the direction of the intermediate portion 45.

Still referring to FIG. 6, it will be seen that a valve housing which is generally indicated by the numeral 50, is mounted on the detachable cover 20. More specifically, the valve housing 50 is defined by a generally cylindrically shaped valve housing wall 51 which is mounted on the first surface 21 of the detachable cover 20, and which is further affixed, at least in part, to the intermediate portion 45 of the semi-circular first sidewall 40. The valve housing is further disposed, at least in part, in predetermined substantially equally spaced relation from the first, inwardly facing sidewall surface 43 thereof. The cylindrically shaped valve housing wall 51 has an outside facing surface 52, and an opposite inwardly facing surface 53, which defines an internal cavity 54 having a given internal diametral dimension. Still further, as seen in the drawings (FIGS. 4 and 6), a passageway 55 is formed through the cylindrically shaped valve housing wall 51, and which will permit the passage of fluid 18 therethrough, in the manner which will be discussed in greater detail, hereinafter. Still further, as will be recognized from the drawings, a guide channel 56 is defined between the outwardly facing surface 52 of the cylindrically shaped valve housing wall 51, and the first inwardly facing sidewall surface 43 of the semi-circular first sidewall 40. The function of this guide channel 56 will be discussed in greater detail, hereinafter. As should be recognized, the cylindrically shaped valve housing wall 51 extends normally outwardly relative to the first surface 21 of the detachable cover 20 and is substantially concentrically outwardly oriented relative to the first opening 33 formed in the detachable cover 20.

As best seen by references to FIGS. 2-5, it will be understood that the fluid dispensing valve 10 includes a rotatable valve control element which is generally indicated by the numeral 60. In this regard, the valve control element 60 includes a base member which is generally indicated by the numeral 70, and which has a first gripping surface 71 which may be engaged by the hand of a user, and a second, opposite surface 72. The base member includes a first portion 73, and a broadened, second portion 74 which has an outside peripheral edge 75. A pointer 76 is incorporated into the peripheral edge 75 and provides a convenient point of reference for a user so as to determine the approximate volume of fluid being allowed to be passed through the valve control element 60 to a child who might be sucking on the sipping spout 30 (FIG. 4). This will be discussed in greater detail, below.

Figure 3:
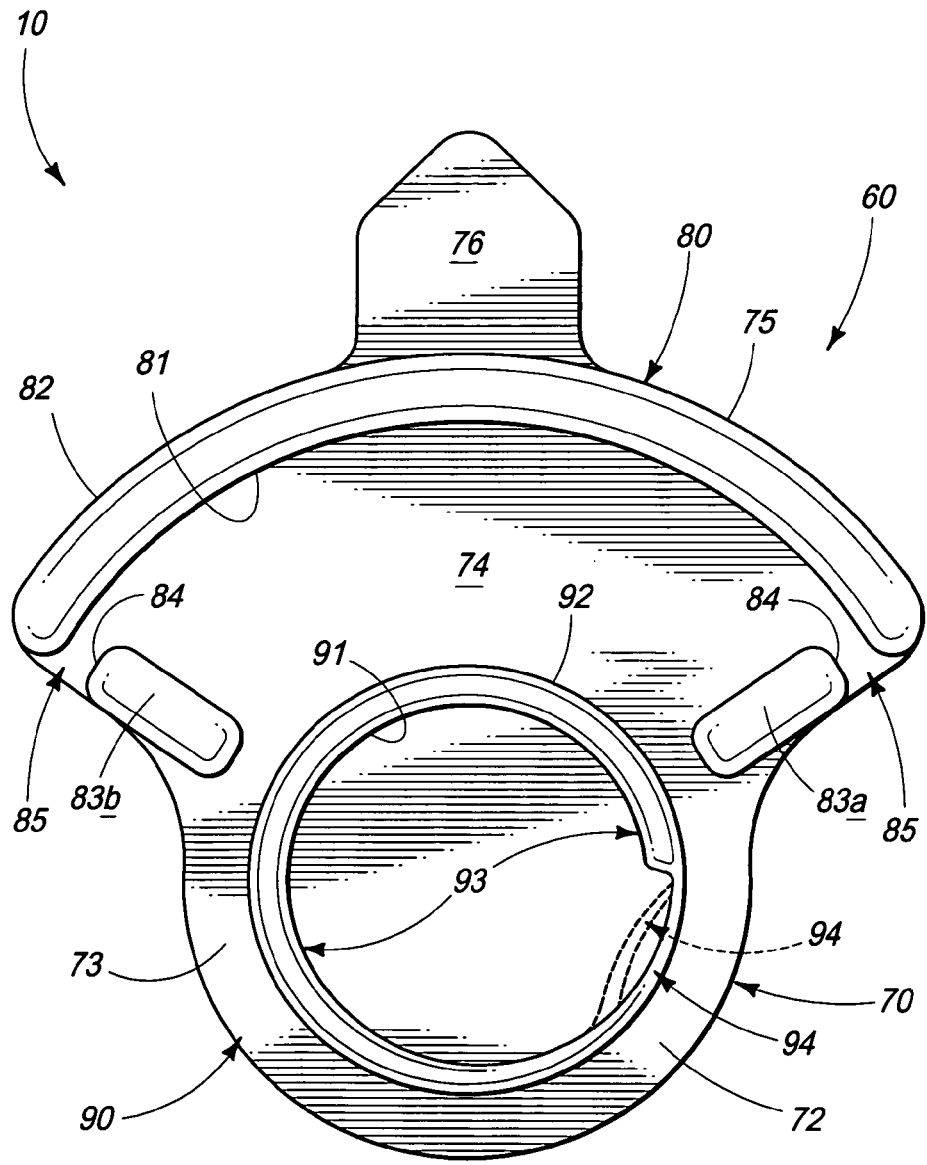
FIG. 3 is a top plan view of a valve control element which forms a feature of the present invention.

Referring more specifically to FIGS. 2-4, the valve control element 60, and more specifically the second surface thereof 72 has attached thereto and extending upwardly therefrom a semi-circular shaped second sidewall 80, which is operable to matingly cooperate with the semi-circular first sidewall 40 (FIG. 4), in order to define, at least in part, a course of rotational movement for the valve control element 60, generally. In this regard, the semi-circular second sidewall 80 extends substantially normally upwardly relative to the peripheral edge 75 of the base member 70 (FIG. 2), and further has a first inwardly facing surface 81, and a second outwardly facing surface 82. As best understood by a study of FIG. 4, the first inwardly facing surface 81 is operable to be disposed in juxtaposed sliding mating relation thereagainst the second or outwardly facing sidewall surface 44 of the semi-circular first sidewall 40 when the valve control element 60 is properly installed. As noted above, the semi-circular second sidewall 80 has a first inwardly facing surface 81, and as seen by reference to FIG. 2, a pair of posts 83A and B are spaced from the first inwardly facing surface 81 and extend normally upwardly relative to the second surface 72. The pair of posts identified by the numerals 83A and 83B provide a means for defining a course of travel for the valve control element as will be described, below. In this regard, the respective pair of post each have an inside facing engagement surface 84 which is spaced a predetermined distance from the first inwardly facing surface 81 to define a gap 85 therebetween. The gap 85 is just slightly larger than the width dimension of the first semi-circular sidewall 40 which is received in the gap 85 (FIG. 4). As should be appreciated, the engagement surface 84 rests in frictional engagement thereagainst the first inwardly facing surface or sidewall 43 of the semi-circular first sidewall 40 thereby capturing the first semi-circular sidewall 40 in the gap. However, the frictional engagement is not so great so as to not permit the selective rotation of the base member along a course of travel, which is generally indicated by the numeral 86. As will be appreciated by a study of FIG. 4, when the first post 83A lies in contact thereagainst the intermediate portion 45 of the semi-circular first sidewall 40, the valve control element 60 will be adjusted so as to provide a minimal amount of fluid from the drinking vessel to a user of the vessel. On the other hand, when the post 83B lies in contact thereagainst the intermediate portion 45 a maximum amount of fluid will be released by the valve control element 60.

Referring now to FIG. 2, it will be seen that extending substantially normally upwardly relative to the second surface 72 of the base member 70 and located within the first portion 73, thereof, is a cylindrically shaped valve sidewall which is generally indicated by the numeral 90, and which is operable to be telescopingly and rotatably received within the internal cavity 54 which is defined by the valve housing 50 (FIG. 6). In this regard, the cylindrically shaped valve sidewall 90 is defined by a first inside facing surface 91 and a second outside facing surface 92. The outside facing surface 92 is operable to be disposed in juxtaposed sliding engagement thereagainst the inside facing surface 53 of the cylindrically shaped valve housing wall 51 (FIG. 5). Still further, it will be seen that the second outside facing surface 92 has an outside diametral dimension which is less than the inside diametral dimension of the internal cavity 54 of the valve housing 50. Still further, it will be understood that the first inside facing surface 91 defines an internal cavity 93 (FIG. 3). Still further, the cylindrically shaped valve sidewall 90 includes a deformable portion 94 which comprises a reduced dimensioned thickness for the sidewall 90 as it is measured in the circumferential direction. As seen and best understood by reference to FIG. 5, the valve control element 60 is telescopingly received in the nature of a friction-fit within the cylindrically shaped valve housing wall 51, and is selectively rotatable relative to the cylindrically shaped valve housing wall 51 so as to locate the deformable portion 94 in alignment relative to the passageway 55 formed through the cylindrically shaped valve housing wall 51 such that when a suction applied by the mouth of a user to the sipping spout 30, it causes the deformable portion 94 of the cylindrically shaped sidewall 90 of the valve control element 60 to deform (FIG. 3) and move out of juxtaposed engagement relative to the cylindrically shaped valve housing wall 51. This deformation allows the fluid 18 which is contained within the drinking vessel 11 to be dispensed to pass through the passageway 55 which is formed in the valve housing wall 50 and move into or to the first opening 33 where it is delivered to the user. Still further, when the user, upon ceasing the suction action on the drinking spout 30 permits the deformable portion 94 of the cylindrically shaped valve housing wall 51 to resume a sealing occluding orientation relative to the passageway 55 formed in the valve housing wall 51. As should be understood from the discussion, above, the selective rotatable positioning of the deformable portion of the valve control element sidewall 94 relative to the passageway 53 formed in the valve housing wall 50 causes a selective, variable amount of fluid 18 to be released to the sipping spout 30, as earlier described. For example, if an individual wanted to maximize the flow of fluid 18 from the vessel 11, the deformable portion 94, and more specifically, the thinnest region thereof would be aligned with the opening 55. As will be appreciated, the thinnest region would deform the greatest thereby allowing the greatest amount of fluid to pass therethrough. On the other hand, orienting the thickest portion of the deformable portion in alignment with the opening 55 will result in the least deformation, and thus the smallest amount of fluid 18 being released from the vessel 11. As will be seen from FIG. 4, the valve control element 60 is located within the cavity 26 as defined by the detachable cover 20. In this location, the valve control element 60 may be set in a given flow position, for example, along the path of travel 86, by a parent or guardian of the child, and then the cover 20 is screwthreadably secured to the drinking vessel 11, so as to prevent a child or infant from gaining access to the valve control element and accidentally changing the flow position of same.

Operation

The operation of the described embodiment of the present invention 10 is believed to be readily apparent and is briefly summarized at this point.

Referring now to the drawings, it will be seen that a fluid dispensing valve 10 of the present invention includes, in its broadest aspect, a valve housing 50 having a wall 51 which defines an internal cavity 54, and wherein a passageway 55 is formed through the wall of the valve housing 50. Still further, in its broadest form of the invention the fluid dispensing valve 10 includes a valve control element 60 having a continuous and deformable sidewall 90 which is coaxially and rotatably received within the internal cavity 54 of the valve housing 50, and wherein at least a portion of the sidewall 94 of the valve control element 60 deforms (FIG. 3) when a vacuum is created in the internal cavity 55 of the valve housing 50, so as to facilitate the controllable delivery of a source of fluid 18 into the valve housing 50. In the arrangement as seen in the drawings, the fluid dispensing valve 10 further includes a fluid container 11 defining a cavity 17 for enclosing the source of fluid 18; and a detachable cover 20 which is borne by the fluid container 11, and wherein the valve housing 50, and valve control element 60 are mounted on the detachable cover 20. In the arrangement as seen in the drawings, the detachable cover 20 has a first opening 33 formed therein which couples the internal cavity 54 of the valve housing 50 with the ambient environment. Still further, when a vacuum is created by a user's mouth sucking action within both the cavity 11 of the fluid container, and the internal cavity 54, a second opening 34 is provided and formed in the detachable cover 20 and which couples the ambient environment with the cavity 11 defined by the fluid container. In the arrangement as seen in the drawings, the continuous and deformable sidewall 90 of the valve control element 60 has a readily deformable portion 94 which has a variable thickness dimension. More specifically, the continuous and deformable sidewall 90 of the valve control element 60 deforms under the influence of the vacuum which is created in the internal cavity 54 of the valve housing 50 as a child, for example, sucks on the sipping spout 30, and when the deformable portion of the sidewall 94 of the valve control element 90, and which has the variable thickness dimension, is at least partially aligned and in juxtaposed at least partial covering and occluding relation relative to the passageway 55 which is formed through the valve housing wall. When the thinnest region of the deformable portion 94 is aligned with the passageway 55, the greatest amount of deformation will result. This causes the greatest amount of fluid 18 to pass through the valve 10. On the other hand, when the thickest region 94 is aligned with the opening 55, the least amount of deformation occurs. This causes the least amount of fluid 18 to pass through the valve 10.

In addition to the foregoing, the present invention includes a valve control element 60 which includes a base member 70 having opposite first and second surfaces 71 and 72. In this regard, the deformable sidewall 90 of valve control element 60 is substantially cylindrically shaped and extends substantially normally upwardly relative to the second surface 72 of the base member 70. It should be understood that when a user applies force to the first surface 71 of the base member 70 it causes the continuous and deformable sidewall 90 of the valve control element to be selectively rotated relative to the valve housing 50 so as to orient the portion of the continuous deformable sidewall portion 94 which deforms under the influence of the vacuum created by a child in selected orientations relative to the passageway 55 which is formed through the valve housing wall 51. In the arrangement as seen in the drawings, the selective positioning of the continuous and deformable sidewall 90 of the valve control element relative to the passageway 55 formed in the valve housing 50 causes a variable amount of fluid 18 to pass into the valve housing 50 when the vacuum is created in the internal cavity of the valve housing 50 by a child's sucking action. This variable fluid flow is caused by the varying deformation of the wall 94 because of its variable thickness dimension. As shown in the drawings, the internal cavity 54 of the valve housing 50 is substantially cylindrically shaped, and has a predetermined inside diametral dimension, and the valve control elements 60 is cylindrically shaped, and has an outside diametral dimension which is less than the inside diametral dimension of the internal cavity 54 of valve housing 50. The valve control element 60 is received in a rotatable, coaxially aligned, friction-fitted orientation within the cylindrically shaped internal cavity 54 of the valve housing 50. In the arrangement as seen in the drawings, the valve control element 60 is substantially cylindrically shaped, and the continuous and deformable sidewall portion 94 has a thickness dimension which varies between about 0.5 mm. to about 1.5 mm. when measured in the circumferential direction. Still further, the deformable portion 94 of the sidewall 90 forming the valve control element 60 represents less than about 50% of the continuous deformable sidewall 90. In the arrangement as seen in the drawings, the fluid container 11 has a top peripheral edge 16. Further, a detachable cover 20 sealably matingly cooperates with the top peripheral edge 16 of the fluid container 11, and which has a first surface 21 facing in the direction of the cavity 17 of the fluid container 11, and a second, opposite surface 22 which faces outwardly relative thereto. The detachable cover 20 has first and second openings 33 and 34 which individually extend through both the first and second surfaces 21 and 22, and which couples the ambient environment to the cavity 17 of the fluid container 11. As seen in FIG. 1, the second surface 22 defines, at least in part, a sipping spout 30, and the first opening 33 is formed in the sipping spout.

A valve housing 50 is made integral with the first surface 21 of the detachable cover 20, and which is defined by a substantially cylindrically shaped wall 51 which extends normally outwardly relative to the first surface 21 of the detachable cover 20. The cylindrically shaped wall 51 defines an internal cavity 54, and the internal cavity 54 of the valve housing 50 is substantially coaxially aligned with the first opening 33 which is formed in the detachable cover 20. The cylindrically shaped wall 51 of the valve housing 50 has a passageway 55 formed therein. As seen in the drawings, a valve control element 60 having a main body defined by a continuous, cylindrically shaped, and partially deformable sidewall 90 is sized so as to be coaxially and rotatably received within the cavity 54 which is defined by the valve housing 50. The deformable sidewall 90 when disposed, at least in part, in juxtaposed relation relative to the passageway 55 formed in the wall of the valve housing 50 deforms under the influence of a vacuum created in the valve housing 50 by a user's mouth sucking action applied to the sipping spout 30. Once this occurs, the fluid 18 contained in the fluid container 11 can pass through the passageway 55 formed in the valve housing 50, and past the deformed sidewall 94 of the valve control element 60 so as to enter the valve housing 50 and be delivered through the sipping spout 30 to the user. As seen in the drawings, the sipping spout 30 extends generally outwardly relative to the second, outwardly facing surface 22 of the detachable cover 20, and further has a distal end 32. The first opening 33 is formed in the distal end 32 thereof, and the first opening, and sipping spout 30 are coupled in fluid flowing relation relative to the internal cavity 54 of the valve housing 50. Still further, as seen in FIG. 1, a handle 25 is mounted on the detachable cover 20 and extends laterally outwardly relative to the detachable cover 20. Still further, for convenience, the detachable cover 20 screwtreadably mates with the fluid container 11.

In the arrangement as seen in the drawings, the fluid dispensing valve 10 includes a first wall 40 mounted on the first surface 21 of the detachable cover 20 which extends normally outwardly relative thereto, and which further is located in spaced relation outwardly relative to the cylindrically shaped wall 51 which defines the valve housing 50. The first wall 40 has outwardly 44 and inwardly 43 facing surfaces, and a guide channel 56 is defined between the valve housing 50 and the semi-circular first sidewall 40. The valve control element 60 has a portion 83A and B which matingly cooperates or is otherwise positioned within the guide channel 56, so as to define a given partial rotational movement along a path of travel 86 of the valve control element 60 relative to the valve housing 50. In the arrangement as seen in the drawings, the fluid dispensing valve 10 further includes a second wall 80 mounted on the second surface 72 of the base member 70, and which is disposed in substantially equally spaced relation outwardly from the continuous and deformable sidewall 90 of the valve control element 60. The second semi-circular shaped sidewall 80 has outwardly and inwardly facing surfaces 82 and 81, respectively. Further, a gap 85 is defined therebetween the second sidewall and the portions 83A and B. The portions 83A and B of the valve control element 60, and which matingly cooperate and are located within the guide channel 56 as defined between the first wall 40 and the valve housing 50 comprises at least one post 83A and B which are located in spaced relation between the inwardly facing surface 81 of the second wall 80 and the valve housing 50. In the arrangement as seen in the drawings, the inside facing surface 81 of the second wall 80 is located in juxtaposed slideable relation thereagainst the outside facing surface 44 of the first wall 40 which is mounted on the second surface 22 of the detachable cover 20. At least one posts 83 defines the rotational course of movement 86 of the valve control element 60 relative to the valve housing 50.

Therefore, it will be seen that the present fluid dispensing valve 10 provides a convenient means whereby a parent or other guardian can conveniently and safely adjust the amount of fluid 18 to be dispensed from a drinking vessel or container 11 in a manner not possible heretofore. Further, the present invention may be readily disassembled and cleaned and disinfected by merely pulling the valve control element 60 out of engagement with the valve housing 50.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A fluid dispensing valve, comprising:
    a valve housing having a wall which defines an internal cavity, and wherein a passageway is formed through the wall of the valve housing; and
    a valve control element having a continuous and deformable sidewall which is coaxially and rotatably received within the internal cavity of the valve housing, and wherein at least a portion of the sidewall of the valve control element deforms when a vacuum is created in the internal cavity of the valve housing so as to facilitate a controllable delivery of a source fluid into the valve housing, and wherein the continuous and deformable sidewall of the valve control element has a portion which has a variable thickness dimension.

2. A fluid dispensing valve, as claimed in claim 1, and further comprising:
    a fluid container defining a cavity for enclosing the source of fluid; and
    a detachable cover borne by the fluid container, and wherein the valve housing and valve control element are mounted on the detachable cover.

3. A fluid dispensing valve as claimed in claim 2, and wherein the detachable cover has a first opening formed therein which couples the internal cavity of the valve housing with a surrounding ambient environment, and wherein the vacuum is created by a user's mouth sucking action, and a second opening is formed in the detachable cover which couples the surrounding ambient environment with the cavity defined by the fluid container.

4. A fluid dispensing valve as claimed in claim 3, and wherein the continuous and deformable sidewall of the valve control element deforms under the influence of the vacuum which is created in the internal cavity of the valve housing when the portion of the sidewall of the valve control element which has the variable thickness dimension is at least partially aligned and at least partially juxtaposed and disposed in covering relation relative to the passageway which is formed through the valve housing wall.

5. A fluid dispensing valve as claimed in claim 1, and wherein the valve control element further comprises:
    a base member having opposite first and second surfaces, and wherein the continuous and deformable sidewall of the valve control element is substantially cylindrically shaped and extends substantially normally upwardly relative to the second surface, and wherein a user, by applying force to the first surface of the base member, causes the continuous and deformable sidewall of the valve control element to be selectively rotated relative to the valve housing so as to orient the portion of the continuous deformable sidewall which deforms under the influence of the vacuum in selected orientations relative to the passageway which is formed through the valve housing wall.

6. A fluid dispensing valve as claimed in claim 5, and wherein a selectively rotatable positioning of the continuous and deformable sidewall of the valve control element relative to the passageway formed in the valve housing causes a variable amount of fluid to pass into the valve housing when the vacuum of a predetermined value is created in the internal cavity of the valve housing.

7. A fluid dispensing valve as claimed in claim 1, and wherein the internal cavity of the valve housing is substantially cylindrically shaped and has a predetermined inside diametral dimension, and the valve control element is cylindrically shaped, and has a predetermined inside diametral dimension, and the valve control element is cylindrically shaped and has an outside diametral dimension which is less than the inside diametral dimension of the internal cavity of the valve housing, and which is further received in a rotatable, coaxially aligned, friction-fitted orientation within the cylindrically shaped internal cavity of the valve housing.

8. A fluid dispensing valve as claimed in claim 1, and wherein the valve control element is substantially cylindrically shaped, and wherein the continuous and deformable sidewall portion has a thickness dimension which varies between about 0.5 mm to about 1.5 mm when measured in a circumferential direction.

9. A fluid dispensing valve as claimed in claim 1, and wherein the valve control element is substantially cylindrically shaped, and wherein the deformable portion of the sidewall forming the valve control element represents less than about 50% of the continuous deformable sidewall.

10. A fluid dispensing valve, comprising:
a fluid container defining a cavity for enclosing a source of fluid to be dispensed, and wherein the fluid container has a top peripheral edge;
a detachable cover which sealingly matingly cooperates with the top peripheral edge of the fluid container, and which has a first surface facing in a direction towards the cavity of the fluid container, and a second opposite surface which faces outwardly relative thereto, and wherein the detachable cover has a first and second opening which individually extend through both the first and second surfaces, and which couples a surrounding ambient environment to the cavity of the fluid container, and wherein the second surface defines a sipping spout, and the first opening is formed in the sipping spout, and wherein the sipping spout extends generally outwardly relative to the second outwardly facing surface of the detachable cover, and further has a distal end, and wherein the first opening is formed in the distal end thereof, and wherein the first opening and the sipping spout are coupled in fluid flowing relation relative to an internal cavity of a valve housing;
a valve housing made integral with the first surface of the detachable cover, and which is defined by a substantially cylindrically shaped wall which extends normally outwardly relative to the first surface of the detachable cover, and which further defines an internal cavity, and wherein the internal cavity of the valve housing is substantially aligned with the first opening formed in the detachable cover, and the cylindrically shaped wall of the valve housing has a passageway formed therein; and
a valve control element having a main body defined by a continuous, cylindrically shaped, and partially deformable sidewall which is sized so as to be coaxially and rotatably received within the cavity defined by the valve housing, and wherein the deformable sidewall when disposed, at least in part, in juxtaposed relation relative to the passageway formed in the wall of the valve housing deforms when a vacuum is created in the valve housing by a user's mouth sucking action which is applied to the sipping spout, and wherein fluid contained in the fluid container can pass through the passageway formed in the valve housing and past the deformed sidewall of the valve control element so as to enter the valve housing and to be delivered through the sipping spout to the user.

11. A fluid dispensing valve, as claimed in claim 10, and further comprising:
a handle mounted on the detachable cover, and extending laterally outwardly relative to the detachable cover.

12. A fluid dispensing valve, as claimed in claim 10, and wherein the detachable cover screwthreadably mates with the fluid container.

13. A fluid dispensing valve, as claimed in claim 10, and further comprising:
a first wall mounted on the surface of the detachable cover, and which extends normally outwardly relative thereto, and which further is located in spaced relation outwardly relative to the cylindrically shaped wall which defines the valve housing, and wherein the first wall has outwardly and inwardly facing surfaces, and wherein a guide channel is defined between the valve housing and the first wall, and wherein the valve control element has a portion which matingly cooperates with the guide channel so as to define a rotational movement of the valve control element relative to the valve housing.

14. A fluid dispensing valve, as claimed in claim 13, and further comprising:
a base member having opposite first and second surfaces, and wherein the continuous and deformable sidewall of the valve control element extends normally upwardly relative to the second surface; and
a second wall mounted on the second surface of the base member and which is disposed in substantially equally spaced relation outwardly from the continuous and deformable sidewall of the valve control element, and which further has outwardly and inwardly facing surfaces, and which further defines a space therebetween, and wherein the portion of the valve control element which matingly cooperates with the guide channel as defined between the first wall and the valve housing comprises at least one post which is located in the space between the inwardly facing surface of the second wall and the valve housing.

15. A fluid dispensing valve as claimed in claim 14, and wherein the inside facing surface of the second wall is located in juxtaposed slideable relation thereagainst the outside facing surface of the first wall which is mounted on the second surface of the detachable cover, and wherein at least one post defines a rotational course of the movement of the valve control element relative to the valve housing.

16. A fluid dispensing valve, as claimed in claim 15, and wherein the first surface of the base member further defines a gripping surface which may be grasped and force applied thereto so as to impart rotational movement to the valve control element.

17. A fluid dispensing valve for a fluid container, comprising:
- a fluid container defining a cavity for enclosing a source of fluid to be dispensed, and wherein the fluid container has a top peripheral edge;
- a detachable cover sealably engaging the top peripheral edge of the fluid container, and wherein the detachable cover has a first inwardly facing surface which faces in a direction towards the cavity, and a second outwardly facing surface, and wherein a sipping spout extends outwardly relative to the second outwardly facing surface, and has formed therein a first opening which extends through the first and second surfaces of the detachable cover, and wherein a semi-circular sidewall, having an intermediate portion and a remaining portion, extends substantially normally outwardly relative to the first inwardly facing surface of the detachable cover, and wherein the semi-circular sidewall has opposite inwardly and outwardly disposed sidewall surfaces, and wherein a second opening is formed in the detachable cover and extends through the intermediate portion of the semi-circular sidewall so as to couple the cavity of the fluid container in air pressure exchanging relation relative to a surrounding ambient environment, and wherein the intermediate portion of the semi-circular sidewall has a thickness dimension which is less than a thickness dimension of the intermediate portion of the semi-circular sidewall;
- a cylindrically shaped valve housing wall mounted on the first surface of the detachable cover, and which is affixed at least in part to the intermediate portion of the semi-circular sidewall and which is disposed at least in part in spaced relation relative to the inwardly disposed sidewall surface of the semi-circular sidewall, and wherein a guide channel is defined therebetween the semi-circular sidewall and the cylindrically shaped valve housing wall, and wherein the cylindrically shaped valve housing wall extends normally outwardly relative to the first surface of the detachable cover, and is substantially concentrically outwardly oriented relative to the first opening, and wherein the cylindrically shaped valve housing wall defines an internal cavity, and wherein a passageway is formed through the cylindrically shaped valve housing wall;
- a hand manipulatable valve control base member having opposite first and second surfaces;
- a cylindrically shaped valve control element which is mounted on the second surface of the hand manipulatable valve control base member, and wherein the valve control element has a cylindrically shaped sidewall having an outside diametral dimension and an inside diametral dimension which defines an internal cavity, and wherein the internal cavity of the valve control element is substantially coaxially aligned relative to the first opening which extends through the detachable cover, and wherein the valve control element is telescopingly received within the cylindrically shaped valve housing wall, and wherein the sidewall of the valve control element is located in supported juxtaposed relation thereagainst the cylindrically shaped valve housing wall, and wherein the sidewall of the valve control element has a deformable portion having a variable thickness dimension when that thickness is measured in a circumferential direction, and wherein the valve control element is selectively rotatable relative to the cylindrically shaped valve housing wall so as to locate the deformable portion in alignment relative to the passageway formed through the cylindrically shaped valve housing wall, and wherein a suction applied by a mouth of a user to the sipping spout causes the deformable portion of the cylindrically shaped sidewall of the valve control element to deform and move out of juxtaposed engagement relative to the cylindrically shaped valve housing wall so as to allow the fluid to be dispensed to pass through the passageway formed in the valve housing wall and into the first opening where the fluid to be dispensed is delivered to the user, and wherein the user, upon releasing the suction on the sipping spout causes the deformable portion of the cylindrically shaped valve control member to assume a sealing, occluding orientation relative to the passageway formed in the valve housing wall, and wherein a selective rotatable positioning of the deformable portion of the valve control element sidewall relative to the passageway formed in the valve housing wall causes a selective, variable amount of fluid to be dispensed through the sipping spout.

\* \* \* \* \*